United States Patent
Kato

(10) Patent No.: US 11,320,289 B2
(45) Date of Patent: May 3, 2022

(54) OPTICAL ENCODER AND CALCULATION METHOD FOR CALCULATING RELATIVE DISPLACEMENT BETWEEN AN ENCODER SCALE AND AN ENCODER HEAD FACING THE SCALE

(71) Applicant: MITUTOYO CORPORATION, Kanagawa (JP)

(72) Inventor: Yoshiaki Kato, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 240 days.

(21) Appl. No.: 16/823,953

(22) Filed: Mar. 19, 2020

(65) Prior Publication Data

US 2020/0309572 A1 Oct. 1, 2020

(30) Foreign Application Priority Data

Mar. 28, 2019 (JP) .............................. JP2019-062374

(51) Int. Cl.
| | |
|---|---|
| *G01D 5/347* | (2006.01) |
| *G01D 5/30* | (2006.01) |
| *G01D 5/244* | (2006.01) |
| *G01D 5/245* | (2006.01) |

(52) U.S. Cl.
CPC ......... *G01D 5/34715* (2013.01); *G01D 5/244* (2013.01); *G01D 5/2451* (2013.01); *G01D 5/30* (2013.01); *G01D 5/347* (2013.01); *G01D 5/34746* (2013.01)

(58) Field of Classification Search
CPC ...... G01D 5/34715; G01D 5/347; G01D 5/30; G01D 5/244; G01D 5/2451; G01D 5/34746
See application file for complete search history.

(56) References Cited

U.S. PATENT DOCUMENTS

| | | | |
|---|---|---|---|
| 2013/0161499 A1* | 6/2013 | Tobiason | G01D 5/2455 250/231.1 |
| 2017/0067758 A1* | 3/2017 | Yaku | G01D 5/34746 |
| 2020/0011711 A1* | 1/2020 | Kato | G01D 5/34715 |

FOREIGN PATENT DOCUMENTS

| | | |
|---|---|---|
| JP | 2005-522682 A | 7/2005 |
| JP | 2012-32295 A | 2/2012 |

\* cited by examiner

*Primary Examiner* — Jennifer D Bennett
(74) *Attorney, Agent, or Firm* — Greenblum.& Bernstein, P.L.C.

(57) ABSTRACT

An optical encoder includes a scale, a calculator, and a head having a light source, an image capturer, and a lens array having first and second lenses. The calculator includes a signal generator, an extractor, a signal combiner, and a displacement calculator. The signal generator generates a sine wave signal. The extractor extracts first and second regions. The signal combiner, based on an inter-regional distance, uses a sine wave signal of the second region to generate a sine wave signal that extends to a first end of the first region such that the generated sine wave signal overlaps with a sine wave signal of the first region. The signal combiner also combines the sine wave signal of the first region with the generated sine wave signal. The displacement calculator calculates an amount of relative displacement based on the sine wave signal that is combined by the signal combiner.

4 Claims, 7 Drawing Sheets

OPTICAL ENCODER AND CALCULATION METHOD FOR CALCULATING RELATIVE DISPLACEMENT BETWEEN AN ENCODER SCALE AND AN ENCODER HEAD FACING THE SCALE

CROSS-REFERENCE TO RELATED APPLICATIONS

The present application claims priority under 35 U.S.C. § 119 of Japanese Application No. 2019-062374, filed on Mar. 28, 2019, the disclosure of which is expressly incorporated by reference herein in its entirety.

BACKGROUND OF THE INVENTION

1. Field of the Invention

The present invention relates to an optical encoder that includes a lens array, and a calculation method for the optical encoder.

2. Description of Related Art

Conventionally, an optical encoder is known which includes a scale having a periodic scale pattern provided along a measurement direction, a head that faces the scale and displaces relative to the scale along the measurement direction, and a calculator that calculates a signal that is based on the relative displacement between the scale and the head. The head includes a light source that emits light toward the scale, an image capturer that captures an image of the light from the light source that arrives via the scale, and a lens arranged between the scale and the image capturer. The calculator calculates the amount of relative displacement between the scale and the head based on the light from the light source that is captured by the image capturer.

FIGS. 7A and 7B are graphs illustrating a method for phase analysis of a sine wave signal with a conventional calculator. For example, as illustrated in FIG. 7A, the calculator generates a sine wave signal from the light that is captured in an image capture region H, which is a region of the image capturer where light can be captured. One period of the sine wave signal is represented by Λ. The calculator calculates the amount of relative displacement between the scale and the head by performing phase analysis of the generated sine wave signal. At this point, the calculator can perform a highly accurate analysis using a Fourier transform in the phase analysis.

In this example, the size of the optical encoder depends on the focal length of the optical system (lens). Specifically, the light from the light source is emitted to the image capturer via the scale and the lens, but in order to crisply emit the image (light) that arrives via the scale, the focal length of the lens must be adjusted. In order to bring the system into focus such that the entire image emitted to the image capturer (i.e., the entire image capture region H) is formed crisply, a certain amount of distance must be provided between the scale and lens, and also between the lens and image capturer. Furthermore, the size of the lens is configured to a size that is proportionate to the image capture region H. Therefore, the optical encoder may become larger in association with the size of the lens, the focal length, and the size of the image capture region H.

In response to such issues, a lens array having a plurality of small-diameter lenses is used instead of a single lens in Japanese Unexamined Patent Publication No. 2005-522682 and Japanese Patent Laid-open Publication No. 2012-32295, for example. The plurality of small-diameter lenses in the lens array each have a small image capture region and short focal length, and therefore an optical encoder can be made smaller compared to when a single lens is used. However, when a lens array is used, an image cannot be formed at the boundaries between the plurality of small-diameter lenses and, as illustrated in FIG. 7B, the image emitted to the image capturer is formed in a state where each small-diameter lens is isolated, as in a first image capture region H1 and a second image capture region H2, for example.

In response to such issues, the optical encoder of Japanese Unexamined Patent Publication No. 2005-522682 (photoelectric encoder) is configured so as to balance an arrangement of each small-diameter lens such that the image formed by an optical detector (image capturer) overlaps at a coordinate phase, and by adjusting the periodicity of the lens array, no isolation occurs in the image formed by the optical detector. Furthermore, when the lens array is formed with plastic, for example, characteristics such as the focal length of each small-diameter lens may change due to changes in temperature, such as thermal expansion, but the optical encoder of Japanese Patent Laid-open Publication No. 2012-32295 corrects the amount of change in each small-diameter lens using the least square method, for example. In sine wave signals that are isolated as in the first image capture region H1 and the second image capture region H2, the phase can be analyzed with the same degree of accuracy as when a Fourier transform is employed using the least square method.

However, in the optical encoder of Japanese Patent Laid-open Publication No. 2012-32295, even when the phase can be analyzed with a high degree of accuracy through calculation, when the optical encoder is mounted in a microcomputer, for example, an unstable matrix calculation occurs and due to the influence of rounding errors, for example, a significant phase error may arise. In addition, phase analysis using the least square method has an extremely large amount of calculation content compared to a Fourier transform, and so requires time for calculation.

SUMMARY OF THE INVENTION

An advantage of the present invention is providing an optical encoder that can calculate an amount of relative displacement between a scale and a head with a high degree of accuracy even when using a lens array that has a plurality of small-diameter lenses.

An optical encoder according to the present invention is an optical encoder that includes a scale having a periodic scale pattern provided along a measurement direction, a head that faces the scale and displaces relative to the scale along the measurement direction, and a calculator that calculates a signal that is based on the relative displacement between the scale and the head, and the head includes a light source that emits light toward the scale, an image capturer that captures an image of the light from the light source that arrives via the scale, and a lens array that is arranged between the scale and the image capturer. The lens array includes a first lens that forms an image that arrives via the scale pattern on the image capturer and a second lens arrayed parallel to the first lens along the measurement direction and that forms an image that arrives via the scale pattern on the image capturer. The calculator includes a signal generator that generates a respective sine wave signal from the image formed by the first lens and the image formed by the second lens, which are captured by the image capturer; an analysis region extractor that extracts a sine wave signal of at least one period from the sine wave signal of the image formed by the first lens, to serve as a first analysis region, and extracts a sine wave signal of the same number of periods as the number of periods of the first analysis region from the sine wave signal of the image formed by the second lens, to serve as a second analysis region; a signal combiner that, based on an inter-regional distance which is the distance from a first end of the first analysis region to a first end of the second analysis region, uses the sine wave signal of the second analysis region to generate a sine wave signal that extends to the first end of the first analysis region such that the generated sine wave signal overlaps with the sine wave signal of the first analysis region, and combines the sine wave signal of the first analysis region with the generated sine wave signal that is based on the sine wave signal of the second analysis region; and a displacement amount calculator that calculates an amount of relative displacement between the scale and the head based on the sine wave signal that is combined by the signal combiner.

According to the present invention, in the calculator, based on the inter-regional distance and using the signal combiner, a sine wave signal that extends to the first end of the first analysis region is generated from the sine wave signal of the second analysis region such that the generated sine wave signal overlaps with the sine wave signal of the first analysis region, and the sine wave signal of the first analysis region is combined with the generated sine wave signal that is based on the sine wave signal of the second analysis region and, using the displacement amount calculator, the amount of relative displacement between the scale and the head is calculated based on the sine wave signal that is combined by the signal combiner. Therefore, a signal for an image that is not formed at the boundary between the first lens and second lens, which are a plurality of small-diameter lenses, can be interpolated without any complicated calculations or corrections. Accordingly, the optical encoder can calculate the amount of relative displacement between the scale and the head with a high degree of accuracy even when using a lens array which has a plurality of small-diameter lenses.

In this case, preferably, the image capturer includes optical receivers that are arrayed in parallel along the measurement direction at a placement pitch p, the analysis region extractor extracts the first analysis region and the second analysis region from the sine wave signal of the image formed by the first lens and the sine wave signal of the image formed by the second lens in such a way that one period $\Lambda$ is multiplied by an integer Q, and the optical receivers are arrayed in parallel so as to be a multiple of an integer q such that the optical receivers are divisible by both one period $\Lambda$ and the placement pitch p.

According to such a configuration, the analysis region extractor performs extraction on the first analysis region and the second analysis region, respectively, in such a way that one period $\Lambda$ of the sine wave signal is multiplied by the integer Q, and the optical receivers are arrayed in parallel so as to be a multiple of the integer q such that the optical receivers are divisible by both one period $\Lambda$ and the placement pitch p, and therefore a Fourier transform, for example, can be used in analyzing a phase. Accordingly, the optical encoder can analyze a phase with a high degree of accuracy using a Fourier transform, even when using the lens array.

In this case, preferably, when a point on the first end of the first analysis region is defined as n=1, a point on a second end of the first analysis region is defined as n=m, a point on the first end of the second analysis region is defined as n=m+1, a point on a second end of the second analysis region is defined as n=N, a signal strength of an nth point is defined as yn, one period contained in the first analysis region and the second analysis region is defined as $\Lambda$, the inter-regional distance is defined as d, the placement pitch of the optical receivers is defined as p, and the phase is defined as $\Phi$, the signal combiner and the displacement amount calculator combine the signals using Formula (1), which is provided in the embodiment, below, and calculate the amount of relative displacement between the scale and the head.

According to such a configuration, the calculator can calculate the amount of relative displacement between the scale and the head using Formula (1), and therefore the present invention can be readily mounted to a microcomputer, for example.

A calculation method for an optical encoder according to the present invention is a calculation method for an optical encoder that includes a scale having a periodic scale pattern provided along a measurement direction, a head that faces the scale and displaces relative to the scale along the measurement direction, and a calculator that calculates a signal that is based on the relative displacement between the scale and the head, and the head includes a light source that emits light toward the scale, an image capturer that captures an image of the light from the light source that arrives via the scale, and a lens array that is arranged between the scale and the image capturer. The lens array includes a first lens that forms an image that arrives via the scale pattern on the image capturer and a second lens arrayed parallel to the first lens along the measurement direction and that forms an image that arrives via the scale pattern on the image capturer. The calculator includes a signal generation step that generates a respective sine wave signal from the image formed by the first lens and the image formed by the second lens, which are captured by the image capturer; an analysis region extraction step that extracts a sine wave signal of at least one period from the sine wave signal of the image formed by the first lens, to serve as a first analysis region, and extracts a sine wave signal of the same number of periods as the number of periods of the first analysis region from the sine wave signal of the image formed by the second lens, to serve as a second analysis region; a signal combination step that, based on an inter-regional distance which is the distance from a first end of the first analysis region to a first end of the second analysis region, uses the sine wave signal of the second analysis region to generate a sine wave signal that extends to the first end of the first analysis region such that the generated sine wave signal overlaps with the sine wave signal of the first analysis region, and combines the sine wave signal of the first analysis region with the generated sine wave signal that is based on the sine wave signal of the second analysis region; and a displacement amount calculation step that calculates an amount of relative displacement between the scale and the head based on the sine wave signal that is combined in the signal combination step.

According to the present invention, in the calculator, based on the inter-regional distance, a sine wave signal that extends to the first end of the first analysis region is generated in the signal combination step from the sine wave signal of the second analysis region such that the generated sine wave signal overlaps with the sine wave signal of the first analysis region, and the sine wave signal of the first analysis region is combined with the generated sine wave signal that is based on the sine wave signal of the second analysis region, and, in the displacement amount calculation step, the amount of relative displacement between the scale and the head is calculated based on the combined sine wave signal. Therefore, a signal for an image that is not formed at the boundary between the first lens and second lens, which are a plurality of small-diameter lenses, can be interpolated without any complicated calculations or corrections. Accordingly, the calculation method for the optical encoder can calculate the amount of relative displacement between the scale and the head with a high degree of accuracy even when the optical encoder uses a lens array which has a plurality of small-diameter lenses.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
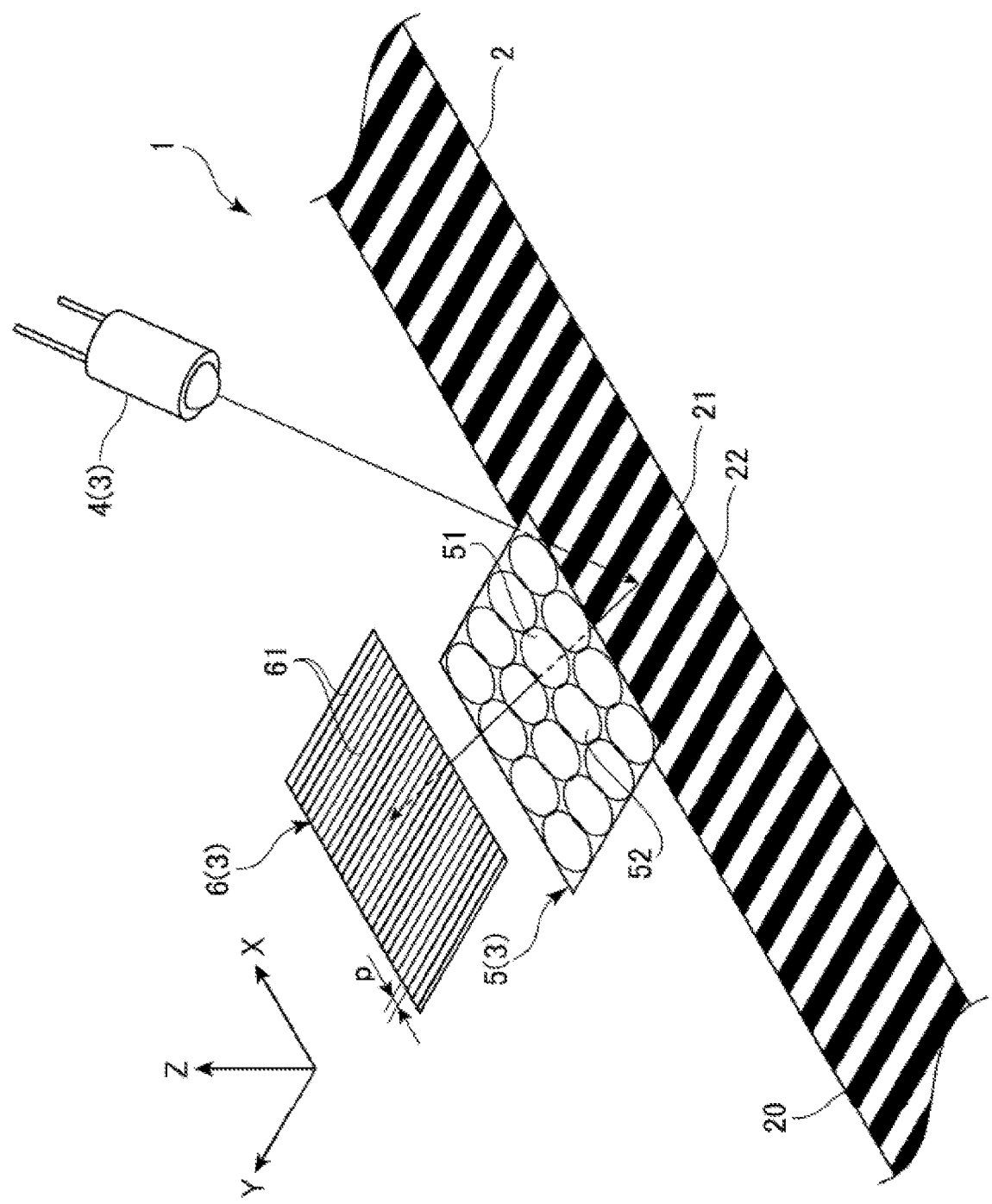
FIG. 1 is a perspective view of an optical encoder according to an embodiment of the present invention.

Hereafter, an embodiment of the present invention is described with reference to FIGS. 1 to 4C. In each of the drawings, a long direction of a scale 2 is illustrated as the X direction, a short direction is illustrated as the Y direction, and a height direction is illustrated as the Z direction. Hereafter, descriptions may be provided simply using the terms X direction, Y direction, and Z direction. FIG. 1 is a perspective view of an optical encoder 1 according to the embodiment of the present invention. As illustrated in FIG. 1, the optical encoder 1 includes a long scale 2 and a head 3 that faces the scale 2 and displaces relative to the scale 2 along the X direction (measurement direction). The optical encoder 1 is a linear encoder used in a linear scale, which is a measuring device not shown in the drawings. The optical encoder 1 is provided inside the linear scale. The linear scale detects a position of the head 3 relative to the scale 2 by displacing the head 3 relative to the scale 2 along the X direction (measurement direction), and outputs the detection results to a display component such as a liquid crystal display, which is not shown in the drawings.

The head 3 includes a light source 4 which emits light toward the scale 2, a lens array 5 having a plurality of small-diameter lenses, and an image capturer 6 which captures an image of the light from the light source 4 that arrives via the scale 2. The head 3 is provided so as to be capable of advancing and retreating in the X direction relative to the scale 2. The light source 4, lens array 5, and image capturer 6 are configured so as to displace integrally relative to the scale 2.

The scale 2 is formed with glass, for example, and is provided with a periodic scale pattern 20 that is provided along the X direction (measurement direction) on one surface. The scale pattern 20 is a reflective type, and includes a reflecting portion 21 that reflects the light from the light source 4 and a non-reflecting portion 22 that does not reflect the light. The scale pattern 20 has the reflecting portion 21 and the non-reflecting portion 22 arrayed in parallel, alternating at a predetermined pitch, along the X direction: a so-called incremental pattern. A sine wave signal (incremental signal) is generated from the light that arrives via the incremental pattern, the light being captured by the image capturer 6. The optical encoder 1 calculates an amount of relative displacement between the scale 2 and the head 3 by analyzing this sine wave signal.

The light source 4 is a light emitting diode (LED), for example. The light source 4 is installed at an appropriate angle for firing the light at the scale 2. The light source 4 is not limited to an LED; any desired light source may be used. The lens array 5 is arranged between the scale 2 and the image capturer 6. The lens array 5 is formed with plastic, for example. The lens array 5 includes, as the plurality of small-diameter lenses, a first lens 51 that forms on the image capturer 6 an image that arrives via the scale pattern 20, and a second lens 52 that is arrayed along the X direction (measurement direction) parallel to the first lens 51, and forms on the image capturer 6 an image that arrives via the scale pattern 20. For convenience in description, two small-diameter lenses arranged at the center of the lens array 5 are treated as the first lens 51 and the second lens 52, but so long as the lenses are arrayed in parallel along the X direction, any small-diameter lenses may be treated as the first lens 51 and the second lens 52. In addition, the lens array 5 may be formed with any transparent material instead of plastic, such as glass.

The image capturer 6 includes optical receivers 61 that are arrayed in parallel along the X direction (measurement direction) at a placement pitch p. A photo diode array (PDA) is used for the optical receivers 61. The image capturer 6 is not limited to a PDA, and may use any detection device such as a position sensitive detector (PSD) or charge-coupled device (CCD). The image capturer 6 is installed facing a +Z direction (upper side on the plane of the drawing sheet) of the lens array 5 so as to overlap with the lens array 5. In other words, the scale 2 and the image capturer 6 are arranged facing each other so as to overlap with each other with the lens array 5 sandwiched between them.

Figure 2:
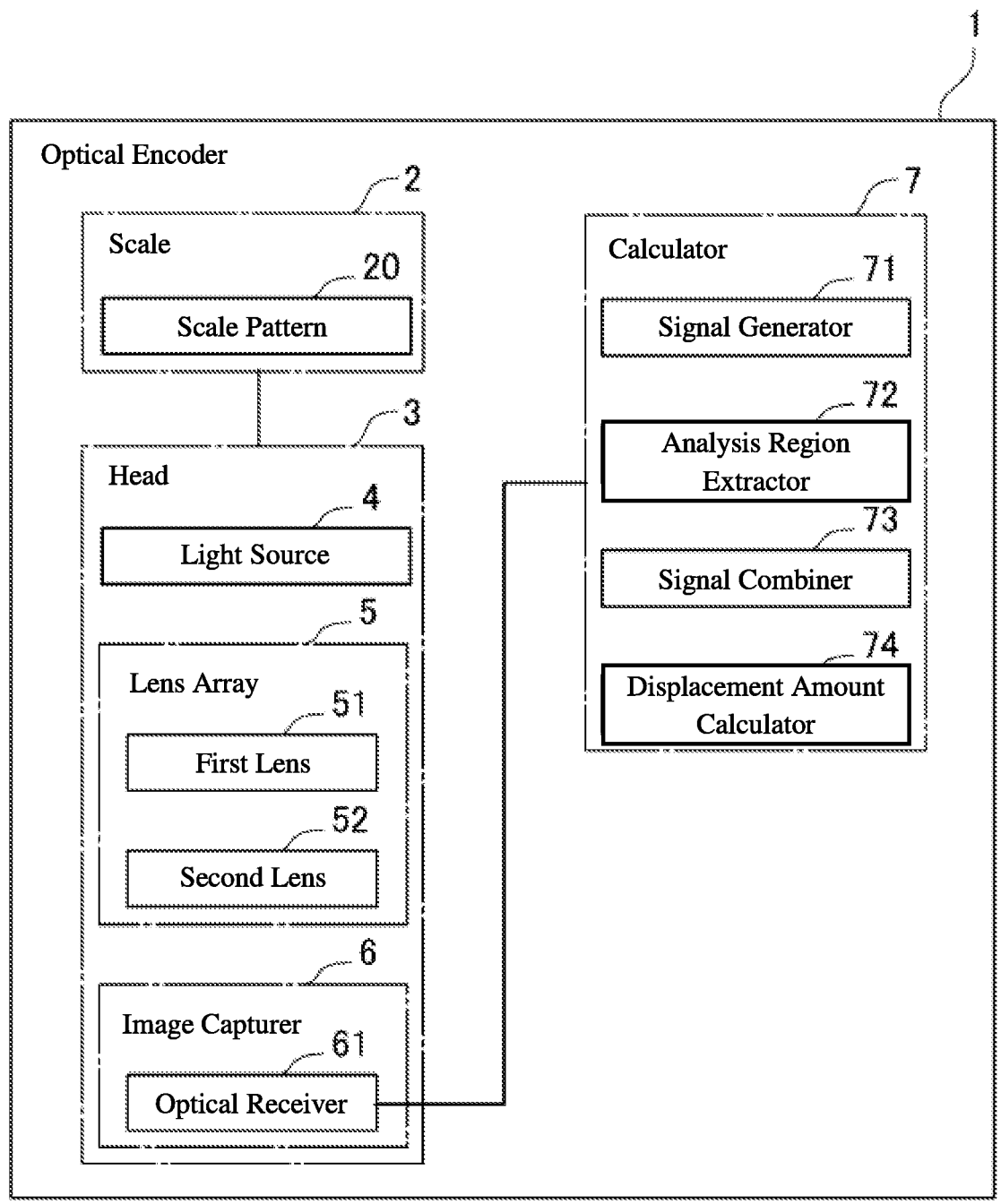
FIG. 2 is a block diagram illustrating the optical encoder.

FIG. 2 is a block diagram illustrating the optical encoder 1. As illustrated in FIG. 2, the optical encoder 1 further includes a calculator 7 that calculates a signal that is based on the relative displacement between the scale 2 and the head 3. The calculator 7 is configured to include a signal generator 71, an analysis region extractor 72, a signal combiner 73, and a displacement amount calculator 74. The calculator 7 may include (but is not limited to) a microcomputer having a processor and a memory that stores a set of instructions executable by the processor for performing the described-herein operations, for example.

The signal generator 71 generates a respective sine wave signal from the image formed by the first lens 51 and the image formed by the second lens 52, which are captured by the image capturer 6. The analysis region extractor 72 extracts a sine wave signal of at least one period from the sine wave signal of the image formed by the first lens 51 to serve as a first analysis region, and extracts a sine wave signal of the same number of periods as the number of periods of the first analysis region from the sine wave signal of the image formed by the second lens 52 to serve as a second analysis region. A specific method for extracting an analysis region with the analysis region extractor 72 is described hereafter with reference to FIGS. 3 to 5E.

Based on an inter-regional distance (the distance from a first end of the first analysis region to a first end of the second analysis region), the signal combiner 73 uses the sine wave signal of the second analysis region to generate a sine wave signal that extends to the first end of the first analysis region such that the generated sine wave signal overlaps with the sine wave signal of the first analysis region, and combines the sine wave signal of the first analysis region with the generated sine wave signal that is based on the sine wave signal of the second analysis region. A specific signal combination method using the signal combiner 73 is described hereafter with reference to FIGS. 3 to 5E. The displacement amount calculator 74 calculates the amount of relative displacement between the scale 2 and the head 3 based on the sine wave signal combined by the signal combiner 73.

Figure 3:
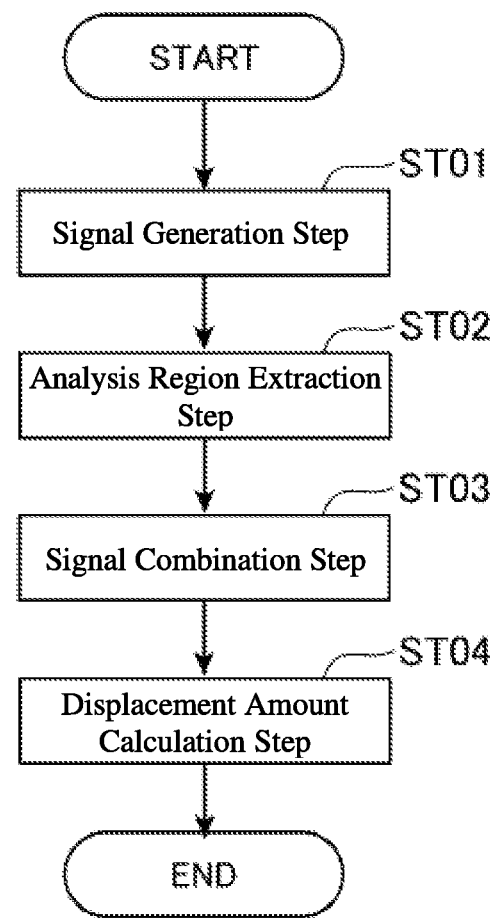
FIG. 3 is a flow chart illustrating a method for calculating an amount of relative displacement with a calculator of the optical encoder.

FIG. 3 is a flow chart illustrating a method for calculating the amount of relative displacement with the calculator 7 of the optical encoder 1, and FIGS. 4A to 5E are graphs illustrating the method for calculating the amount of relative displacement using the calculator 7 of the optical encoder 1. The drawing designations are broken into FIG. 4 and FIG. 5, but graphs (A) to (E) illustrate the flow of a single sequence in the method for calculating the amount of relative displacement using the calculator 7. Hereafter, a specific method for calculating the amount of relative displacement in the optical encoder 1 is described with reference to FIGS. 3 to 5E.

First, as illustrated in FIG. 3, a signal generation step is executed in which, when the optical receivers 61 in the image capturer 6 capture an image of the light from the light source 4 that arrives via the scale 2, the signal generator 71 uses each of the image formed by the first lens 51 and the image formed by the second lens 52, which are captured by the image capturer 6, to generate a respective sine wave signal (step ST01). In the signal generation step performed by the signal generator 71, as illustrated in FIG. 4A, a sine wave signal is generated from an image captured in a first image capture region h1, which is the range where image capture of the first lens 51 is possible, and a sine wave signal is generated from an image captured in a second image capture region h2, which is the range where image capture of the second lens 52 is possible.

Figure 4A:
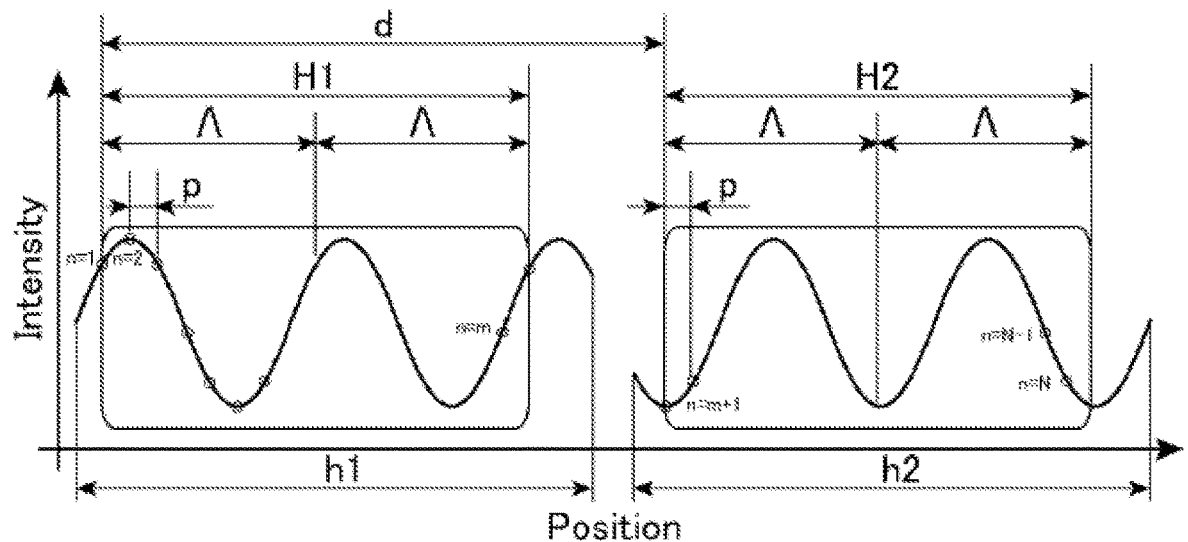
FIGS. 4A to 4C are graphs illustrating the method for calculating the amount of relative displacement with the calculator of the optical encoder.

Next, as illustrated in FIGS. 3 and 4A, an analysis region extraction step is executed in which the analysis region extractor 72 extracts a two-period sine wave signal from the sine wave signal of the image for the first image capture region h1 of the first lens 51 to serve as a first analysis region H1, and extracts a sine wave signal of the same number of periods as the number of periods in the first analysis region H1 (that is, a two-period sine wave signal) from the sine wave signal of the image for the second image capture region h2 of the second lens 52 to serve as a second analysis region H2 (step ST02).

The analysis region extractor 72 extracts the first analysis region H1 and the second analysis region H2 from the sine wave signal of the image for the first image capture region h1 of the first lens 51 and the sine wave signal of the image for the second image capture region h2 of the second lens 52 in such a way that one period Λ is multiplied by an integer Q (H1=ΛQ and H2=ΛQ). At this point, the relationship (first analysis region H1)=(second analysis region H2)=ΛQ is required. In addition, the optical receivers 61 are arrayed in parallel so as to be a multiple of an integer q such that the optical receivers 61 are divisible by both one period Λ and the placement pitch p. This is because the optical encoder 1 analyzes a phase using a Fourier transform.

Figure 4B:
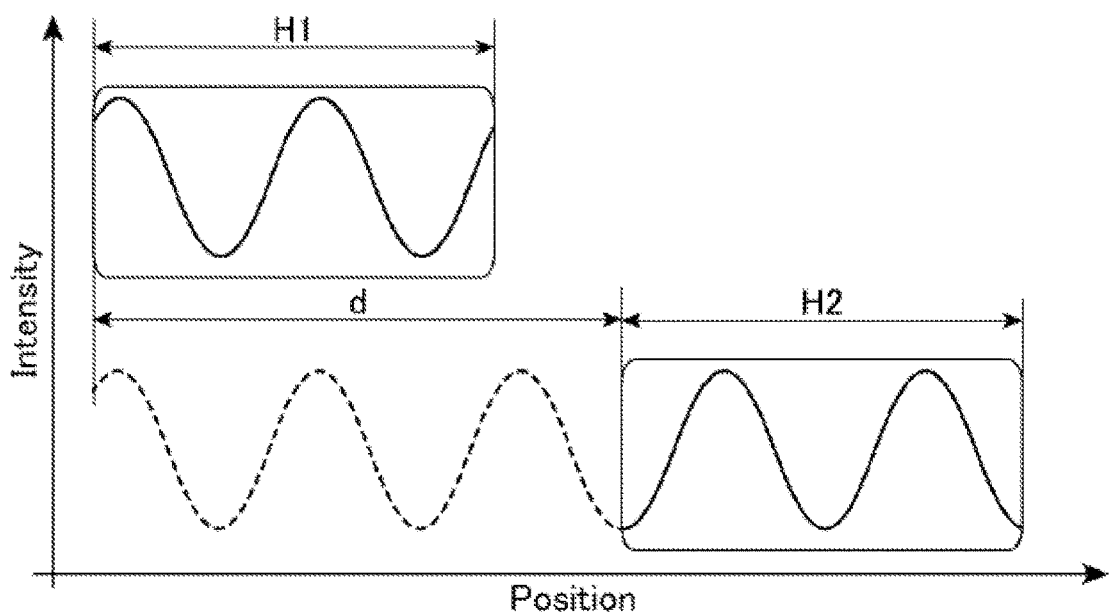
Figure 4C:
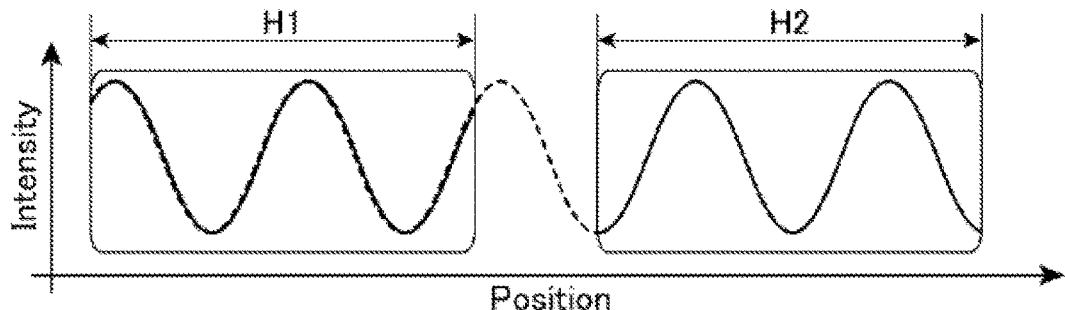
Figure 5D:
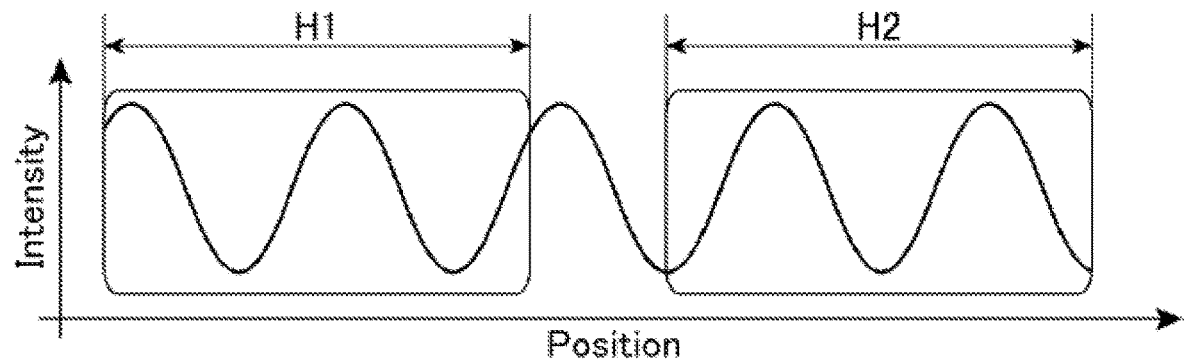
FIGS. 5D and 5E are graphs illustrating the method for calculating the amount of relative displacement with the calculator of the optical encoder.

Next, a signal combination step is executed in which, based on an inter-regional distance d, which is the distance from the first end of the first analysis region H1 (left side on the drawing sheet) to the first end of the second analysis region H2 (left side on the drawing sheet), as illustrated in FIGS. 4B and 4C, the signal combiner 73 uses the sine wave signal of the second analysis region H2 to generate a sine wave signal (indicated in the drawings by a dashed line) that extends to the first end of the first analysis region H1 such that the generated sine wave signal overlaps with the sine wave signal of the first analysis region H1 and, as illustrated in FIG. 5D, combines the sine wave signal of the first analysis region H1 with the generated, dashed-line sine wave signal that is based on the sine wave signal of the second analysis region H2 (step ST03). FIG. 4B illustrates a situation in which the dashed-line sine wave signal that is based on the sine wave signal of the second analysis region H2 is generated, and so the positions of the first analysis region H1 and the second analysis region H2 are depicted as being arranged offset in the vertical direction on the plane of the drawing sheet, but in reality the dashed-line sine wave signal is generated in the state shown in FIG. 4C.

Figure 5E:
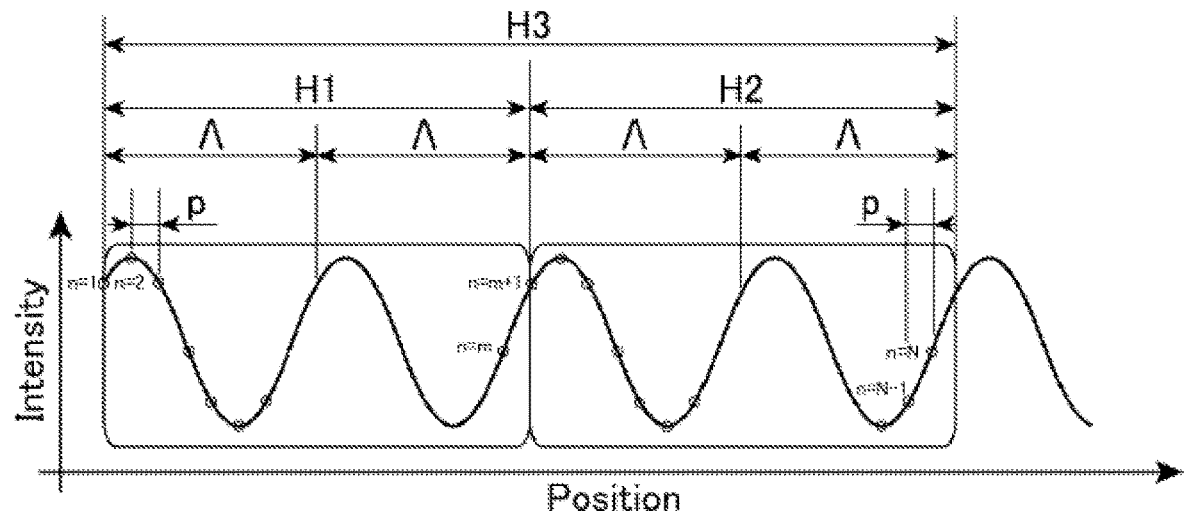

In addition, as illustrated in FIG. 3, a displacement amount calculation step is executed in which the displacement amount calculator 74 calculates the amount of relative displacement between the scale 2 and the head 3 based on the combined sine wave signal from the signal combination step of the signal combiner 73 (step ST04). Specifically, when the signal combiner 73 combines the sine wave signals in FIG. 5D, the displacement amount calculator 74 shifts the second analysis region H2 along the sine wave signal by the amount of separation between the signals produced by the first lens 51 and the second lens 52 (i.e., until the second end of the first analysis region H1 (right side on the drawing sheet) and the first end of the second analysis region H2 touch) as illustrated in FIG. 5E, and calculates the amount of relative displacement between the scale 2 and the head 3 based on the sine wave signal within an analysis region H3, which combines the first analysis region H1 and the second analysis region H2.

The signal combiner 73 and the displacement amount calculator 74 combine the two sine wave signals using the following formula, which is a Fourier transform, and calculate the amount of relative displacement between the scale 2 and the head 3. Specifically, when a point on the first end of the first analysis region H1 is defined as n=1, a point on the second end of the first analysis region H1 is defined as n=m, a point on the first end of the second analysis region H2 is defined as n=m+1, a point on the second end of the second analysis region H2 is defined as n=N, a signal strength of the nth point is defined as yn, one period contained in the first analysis region H1 and the second analysis region H2 is defined as Λ, the inter-regional distance is defined as d, the placement pitch of the optical receivers 61 is defined as p, and the phase is defined as Φ, the signals are combined using Formula (1) and the amount of relative displacement between the scale 2 and the head 3 is calculated.

[Formula 1]

$$\Phi = \arg\left[\sum_{n=1}^{m} y_n e^{i2\pi \frac{pn}{\Lambda}} + \sum_{n=m+1}^{m} y_n e^{i2\pi \frac{pn}{\Lambda}} e^{-i2\pi \frac{d}{\Lambda}}\right] \quad (1)$$

Even when a sine wave signal for finding a phase cannot be obtained merely by isolating the sine wave signals generated in this way by the first lens 51 and the second lens 52 using the calculator 7 and simply adding the isolated sine wave signals together using the respective properties of the first lens 51 and the second lens 52, the two isolated signals can be combined and corrected, and also interpolated, by the signal combiner 73, and therefore the amount of relative displacement between the scale 2 and the head 3 can be calculated with a high degree of accuracy.

In this way, the following effects and advantages can be achieved according to the present embodiment:

(1) In the calculator 7, based on the inter-regional distance d and using the signal combiner 73, a sine wave signal that extends to the first end of the first analysis region H1 is generated from the sine wave signal of the second analysis region H2 such that the generated sine wave signal overlaps with the sine wave signal of the first analysis region H1, and the sine wave signal of the first analysis region H1 is combined with the generated sine wave signal that is based on the sine wave signal of the second analysis region H2. Using the displacement amount calculator 74, the amount of relative displacement between the scale 2 and the head 3 is calculated based on the sine wave signal that is combined by the signal combiner 73. Therefore, a signal for an image that is not formed at the boundary between the first lens 51 and second lens 52, which are the plurality of small-diameter lenses of the lens array 5, can be interpolated without any complicated calculations or corrections. Accordingly, the optical encoder 1 can calculate the amount of relative displacement between the scale 2 and the head 3 with a high degree of accuracy even when using the lens array 5.

(2) The analysis region extractor 72 performs extraction on the first analysis region H1 and the second analysis region H2, respectively, in such a way that one period Λ of the sine wave signal is multiplied by the integer Q, and the optical receivers 61 are arrayed in parallel so as to be a multiple of the integer q such that the optical receivers 61 are divisible by both one period Λ and the placement pitch p. Therefore, a Fourier transform can be used in analyzing a phase. Accordingly, the optical encoder 1 can analyze a phase with a high degree of accuracy using a Fourier transform, even when using the lens array 5.

(3) The calculator 7 can calculate the amount of relative displacement between the scale 2 and the head 3 using Formula (1), and therefore the present invention can be readily mounted to a microcomputer, for example.

(4) In the calculator 7, in the signal combination step, based on the inter-regional distance d, a sine wave signal that extends to the first end of the first analysis region H1 is generated from the sine wave signal of the second analysis region H2 such that the generated sine wave signal overlaps with the sine wave signal of the first analysis region H1, and the sine wave signal of the first analysis region H1 is combined with the generated sine wave signal that is based on the sine wave signal of the second analysis region H2, and, in the displacement amount calculation step, the amount of relative displacement between the scale 2 and the head 3 is calculated based on the combined sine wave signal. Therefore, a signal for an image that is not formed at the boundary between the first lens 51 and second lens 52 can be interpolated without any complicated calculations or corrections. Accordingly, the calculation method for the optical encoder 1 can calculate the amount of relative displacement between the scale 2 and the head 3 with a high degree of accuracy even when the optical encoder 1 uses the lens array 5.

Modifications

Moreover, the present invention is not limited to the above-described embodiment, and includes modifications and improvements within a scope capable of achieving the advantages of the present invention. For example, in the embodiment described above, the optical encoder 1 is used in a linear scale that serves as a measuring device, but the optical encoder may also be used in another measuring device, such as a dial gauge (test indicator) or micrometer. That is, an optical encoder is not particularly limited in terms of the form, method, or the like of the measuring device in which it is used and can be used in other measuring devices or the like, as well. The optical encoder of the present invention is not particularly limited in what it can be mounted to. In addition, the optical encoder may be used in a device other than a measuring device such as a sensor.

In the embodiment described above, the optical encoder 1 is a linear encoder, but the optical encoder may also be a rotary encoder. In addition, in the embodiment described above, the image capturer 6 includes the optical receivers 61, but an image capturer need not include an optical receiver. Any component may be used so long as the light from the light source that arrives via the scale can be captured. In the embodiment described above, the calculator 7 is a microcomputer, for example, but the calculator need not be a microcomputer and may instead be, for example, a personal computer that is connected externally. The calculator may be configured by any component so long as the component can perform calculations.

In the embodiment described above, the analysis region extractor 72 executes the analysis region extraction step where a two-period sine wave signal is extracted from the sine wave signal of the image for the first image capture region h1 of the first lens 51 to serve as the first analysis region H1, and a two-period sine wave signal is similarly extracted from the sine wave signal of the image for the second image capture region h2 of the second lens 52 to serve as the second analysis region H2. However, an analysis region extractor need not designate a two-period sine wave signal as a first analysis region and second analysis region, and can extract a sine wave signal of at least one period as the first analysis region and second analysis region. That is, the analysis region extractor can extract a sine wave signal of at least one period from the sine wave signal of the image formed by the first lens to serve as the first analysis region, and can extract a sine wave signal of the same number of periods as the number of periods of the first analysis region from the sine wave signal of the image formed by the second lens to serve as the second analysis region.

In the embodiment described above, in FIGS. 4A to 5E, the first analysis region H1 is shown on the left side of the drawing sheet and the second analysis region H2 is shown on the right side, but the left side of the drawing sheet may be treated as the second analysis region H2 and the right side of the drawing sheet may be treated as the first analysis region H1. Also, based on an inter-regional distance d, which is the distance from the first end of the first analysis region H1 (left side on the drawing sheet) to the first end of the second analysis region H2 (left side on the drawing sheet), as illustrated in FIGS. 4B and 4C, the signal combiner 73 uses the sine wave signal of the second analysis region H2 to generate a sine wave signal (indicated in the drawings by a dashed line) that extends to the first end of the first analysis region H1 such that the generated sine wave signal overlaps with the sine wave signal of the first analysis region H1. However, so long as the sine wave signal of the second analysis region can be used to generate a sine wave signal that extends to the first end of the first analysis region so as to overlap with the sine wave signal of the first analysis region, either the left or right direction of the drawing sheet may be treated as the first end.

In the embodiment described above, the signal combiner 73 and displacement amount calculator 74 use Formula (1) to combine two sine wave signals (the sine wave signal of the first analysis region H1 acquired via the first lens 51 and the sine wave signal of the second analysis region H2 acquired via the second lens 52) and calculate the amount of relative displacement between the scale 2 and the head 3. However, a third lens arrayed parallel to the second lens 52 along the X direction (measurement direction) that forms an image that arrives via the scale pattern on the image capturer 6 may be further provided, and the signal combiner 73 and displacement amount calculator 74 may combine three sine wave signals using the sine wave signal of a third analysis region acquired via the third lens and calculate the amount of relative displacement between the scale and the head. In such a case, because of the third sine wave signal, a third term similar to the second term of Formula (1) must be used, and the inter-regional distance is not the distance from the first end of the first analysis region H1 to the first end of the second analysis region H2, but rather must be calculated as an inter-regional distance d' from the first end of the second analysis region H2 to the first end of the third analysis region. That is, the signal combiner is not limited to two sine wave signals, but may combine signals for sine wave signals generated in accordance with the number of the plurality of small-diameter lenses present in the lens array.

Also, the signal combiner 73 and the displacement amount calculator 74 perform combination using Formula (1), which is a Fourier transform, and calculate the amount of relative displacement between the scale 2 and the head 3. However, using Formula (1) or another Fourier transform to perform the calculation is not necessary, and the calculation may be performed with another method. That is, based on the inter-regional distance, which is the distance from the first end of the first analysis region to the first end of the second analysis region, the signal combiner can use the sine wave signal of the second analysis region to generate a sine wave signal that extends to the first end of the first analysis region such that the generated sine wave signal overlaps with the sine wave signal of the first analysis region, and can combine the sine wave signal of the first analysis region and the sine wave signal that is based on the generated sine wave signal of the second analysis region. The displacement amount calculator can calculate the amount of relative displacement between the scale and the head based on the sine wave signal that is combined by the signal combiner.

Figure 6A:
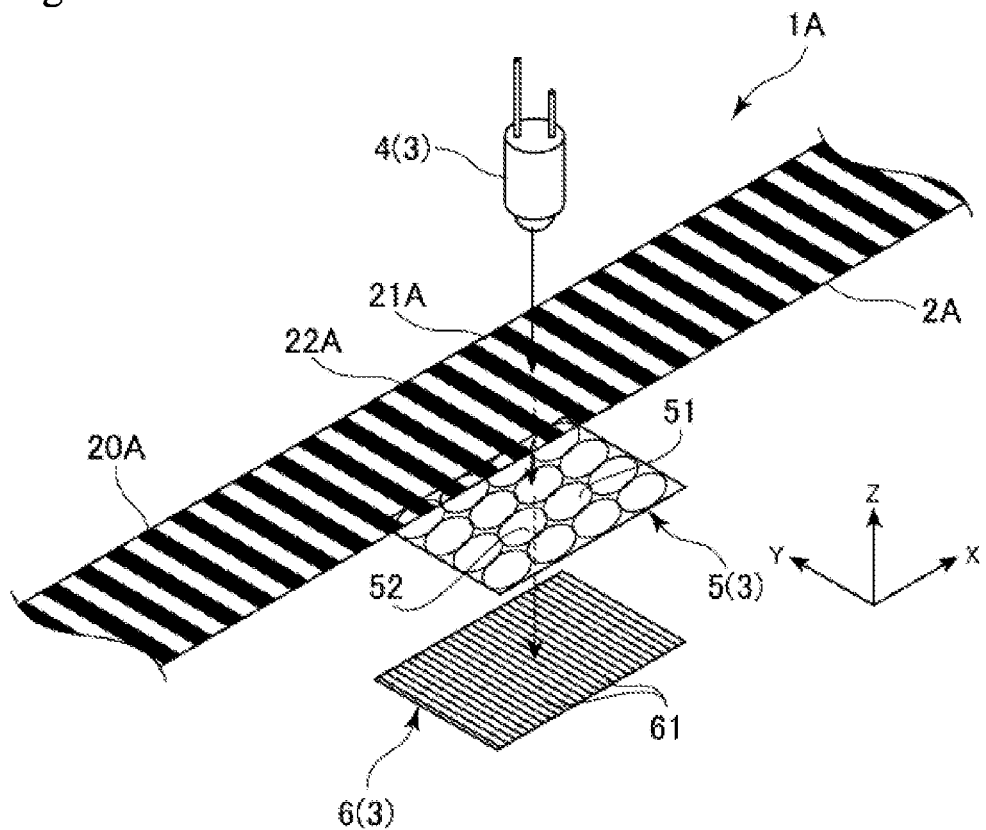
FIGS. 6A and 6B are perspective views of optical encoders according to modifications.
Figure 6B:
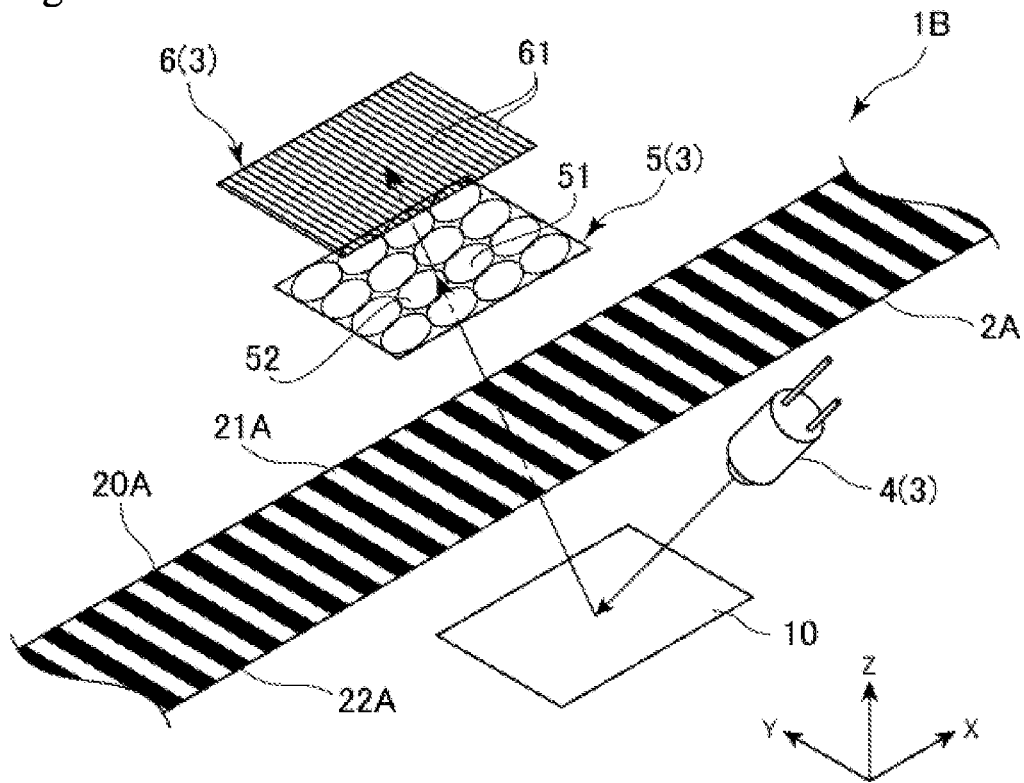
Figure 7A:
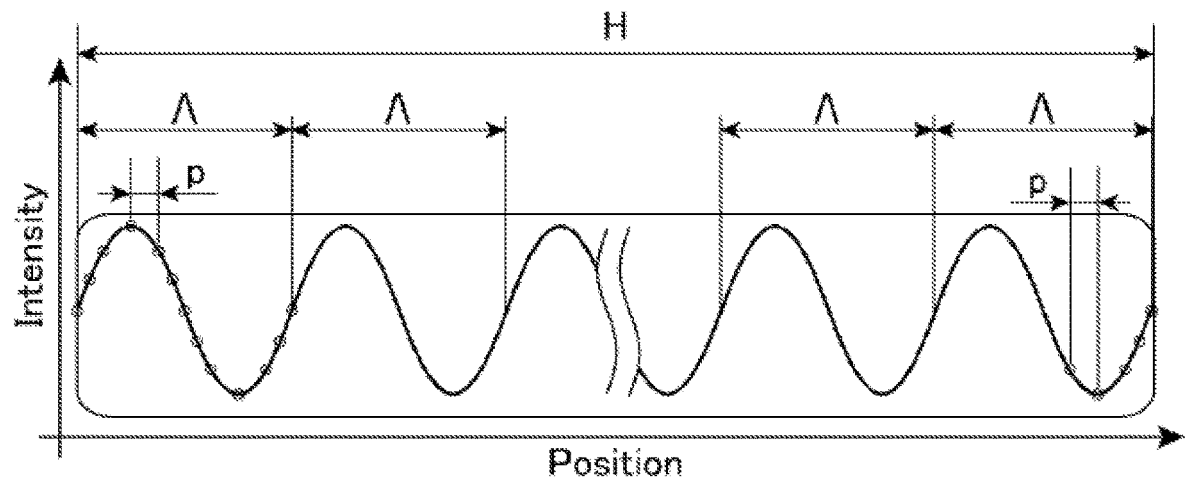
FIGS. 7A and 7B are graphs illustrating a method for phase analysis of a sine wave signal with a conventional calculator.
Figure 7B:
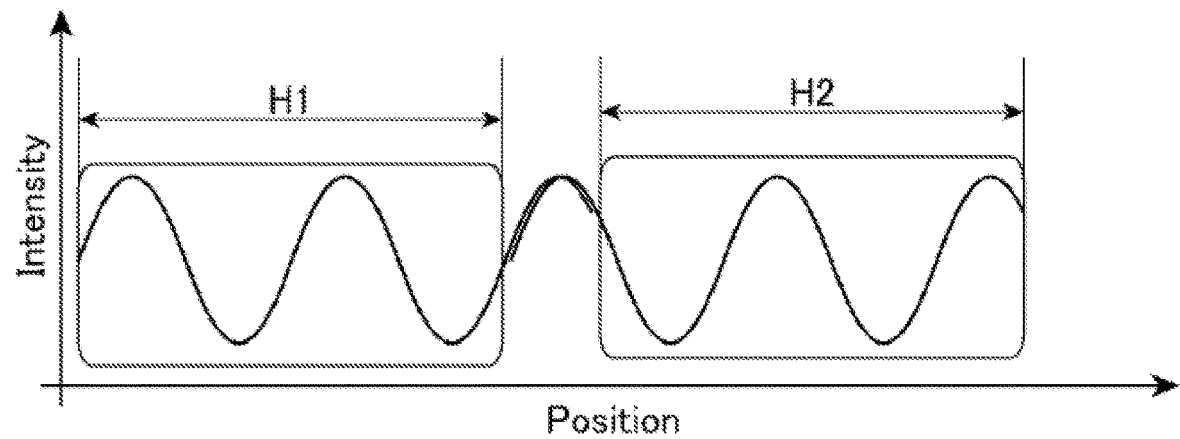

FIGS. 6A and 6B are perspective views of optical encoders according to modifications. Specifically, FIG. 6A is a perspective view of an optical encoder 1A according to a first modification and FIG. 6B is a perspective view of an optical encoder 1B according to a second modification. In the embodiment described above, the scale 2 of the optical encoder 1 includes the reflective-type scale pattern 20.

In the first modification, a scale 2A of the optical encoder 1A differs from the embodiment described above in that the scale 2A has a transparent-type scale pattern 20A, as illustrated in FIG. 6A. The scale pattern 20 includes a transparent portion 21A through which light from the light source 4 passes and a non-transparent portion 22 through which light does not pass, and the optical encoder 1A calculates the amount of relative displacement between the scale and the head by analyzing the sine wave signals generated by the light that arrives via the scale pattern 20A, similar to when the scale pattern is a reflective type. By doing this, even when the optical encoder 1A has a transparent-type scale pattern, the optical encoder 1A can be made smaller using the lens array 5, and can also calculate the amount of relative displacement between the scale 2A and the head 3 with a high degree of accuracy.

In the second modification, as illustrated in FIG. 6B, the optical encoder 1B differs from the first modification in that the optical encoder 1B further includes a reflecting component 10 that reflects the light from the light source 4. The reflecting component 10 is, for example, a mirror, but may be any component that is capable of reflecting light from the light source 4 toward the scale 2A. Accordingly, the position of the light source 4 in the optical encoder 1B can be freely designed, and therefore the degree of freedom in designing the optical encoder 1B can be enhanced.

As noted above, the present invention can be favorably used in an optical encoder that includes a lens array, and in a calculation method for the optical encoder.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical encoder comprising:
  a scale having a periodic scale pattern provided along a measurement direction;

a head that faces the scale and displaces relative to the scale along the measurement direction, the head comprising:
  a light source that emits light toward the scale;
  an image capturer that captures an image of the light from the light source that arrives via the scale; and
  a lens array that is arranged between the scale and the image capturer, the lens array comprising:
    a first lens that forms an image that arrives via the scale pattern on the image capturer; and
    a second lens arrayed parallel to the first lens along the measurement direction and that forms an image that arrives via the scale pattern on the image capturer, and
  a calculator that calculates a signal that is based on the relative displacement between the scale and the head, the calculator comprising a processor and a memory that stores a set of executable instructions, wherein upon execution of the executable instructions by the processor, the calculator operates as:
    a signal generator that generates a respective sine wave signal from the image formed by the first lens and the image formed by the second lens, which are captured by the image capturer;
    an analysis region extractor that extracts a sine wave signal of at least one period from the sine wave signal of the image formed by the first lens, to serve as a first analysis region, and extracts a sine wave signal of the same number of periods as the number of periods of the first analysis region from the sine wave signal of the image formed by the second lens, to serve as a second analysis region;
    a signal combiner that, based on an inter-regional distance which is the distance from a first end of the first analysis region to a first end of the second analysis region, uses the sine wave signal of the second analysis region to generate a sine wave signal that extends to the first end of the first analysis region such that the generated sine wave signal overlaps with the sine wave signal of the first analysis region, and combines the sine wave signal of the first analysis region with the generated sine wave signal that is based on the sine wave signal of the second analysis region; and
    a displacement amount calculator that calculates an amount of relative displacement between the scale and the head based on the sine wave signal that is combined by the signal combiner.

2. The optical encoder according to claim 1, wherein:
  the image capturer comprises optical receivers that are arrayed in parallel along the measurement direction at a placement pitch p,
  the analysis region extractor extracts the first analysis region and the second analysis region from the sine wave signal of the image formed by the first lens and the sine wave signal of the image formed by the second lens in such a way that one period $\Lambda$ is multiplied by an integer Q, and
  the optical receivers are arrayed in parallel so as to be a multiple of an integer q such that the optical receivers are divisible by both one period $\Lambda$ and the placement pitch p.

3. The optical encoder according to claim 2, wherein, when a point on the first end of the first analysis region is defined as n=1, a point on a second end of the first analysis region is defined as n=m, a point on the first end of the second analysis region is defined as n=m+1, a point on a second end of the second analysis region is defined as n=N, a signal strength of an nth point is defined as yn, one period contained in the first analysis region and the second analysis region is defined as $\Lambda$, the inter-regional distance is defined as d, the placement pitch of the optical receivers is defined as p, and a phase is defined as $\Phi$, the signal combiner and the displacement amount calculator combine the signals using Formula (1), $$\Phi = \arg\left[\sum_{n=1}^{m} y_n e^{i2\pi \frac{pn}{\Lambda}} + \sum_{n=m+1}^{m} y_n e^{i2\pi \frac{pn}{\Lambda}} e^{-i2\pi \frac{d}{\Lambda}}\right] \quad (1)$$

and calculate the amount of relative displacement between the scale and the head.

4. A calculation method for an optical encoder that includes a scale having a periodic scale pattern provided along a measurement direction, a head that faces the scale and displaces relative to the scale along the measurement direction, the head including a light source that emits light toward the scale, an image capturer that captures an image of the light from the light source that arrives via the scale, and a lens array that is arranged between the scale and the image capturer, wherein the lens array includes a first lens that forms an image that arrives via the scale pattern on the image capturer, and a second lens arrayed parallel to the first lens along the measurement direction and that forms an image that arrives via the scale pattern on the image capturer, the method comprising:
  generating a respective sine wave signal from the image formed by the first lens and the image formed by the second lens, which are captured by the image capturer;
  extracting a sine wave signal of at least one period from the sine wave signal of the image formed by the first lens, to serve as a first analysis region,
  extracting a sine wave signal of the same number of periods as the number of periods of the first analysis region from the sine wave signal of the image formed by the second lens, to serve as a second analysis region;
  using, based on an inter-regional distance which is the distance from a first end of the first analysis region to a first end of the second analysis region, the sine wave signal of the second analysis region to generate a sine wave signal that extends to the first end of the first analysis region such that the generated sine wave signal overlaps with the sine wave signal of the first analysis region;
  combining the sine wave signal of the first analysis region with the generated sine wave signal that is based on the sine wave signal of the second analysis region; and
  calculating an amount of relative displacement between the scale and the head based on the combined sine wave signal.

* * * * *